(12) United States Patent
Han

(10) Patent No.: US 6,511,038 B1
(45) Date of Patent: Jan. 28, 2003

(54) APPARATUS FOR DAMPENING VIBRATIONS OF AN AUTOMATIC GUIDED VEHICLE

(75) Inventor: Yong-seob Han, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/659,545

(22) Filed: Sep. 11, 2000

(51) Int. Cl.⁷ .................... F16M 13/00; F16M 1/00
(52) U.S. Cl. ................ 248/646; 248/638; 248/188.8
(58) Field of Search ................ 248/638, 644, 248/646, 674, 675, 677, 562, 580, 178, 188.8, 188.9, 564, 611, 615, 635, 901; 52/167.4

(56) References Cited

U.S. PATENT DOCUMENTS

| | | | | |
|---|---|---|---|---|
| 4,703,911 A | * | 11/1987 | Rammell | 248/677 |
| 5,035,396 A | * | 7/1991 | Krum et al. | 248/635 |
| 5,369,838 A | * | 12/1994 | Wood et al. | 15/320 |
| 5,370,352 A | * | 12/1994 | Platus | 248/619 |
| 5,884,891 A | * | 3/1999 | Hawkins et al. | 248/613 |
| 6,000,670 A | * | 12/1999 | Okamoto | 248/562 |
| 6,062,528 A | * | 5/2000 | Beck et al. | 248/674 |
| 6,092,780 A | * | 7/2000 | Kurabayashi et al. | 248/636 |
| 6,138,967 A | * | 10/2000 | Okamoto | 248/188.1 |
| 6,216,991 B1 | * | 4/2001 | Okamtot | 248/188.1 |

FOREIGN PATENT DOCUMENTS

| | | | | |
|---|---|---|---|---|
| GB | | 580918 B1 | * 9/1946 | 248/635 |

* cited by examiner

Primary Examiner—Ramon O. Ramirez
Assistant Examiner—Jon Szumny
(74) Attorney, Agent, or Firm—Robert E. Bushnell, Esq.

(57) ABSTRACT

A vibration absorber absorbs a vibration of an automatic guided vehicle in a three-dimensional direction. The vibration absorber includes: a base member having an accommodating hole formed therein; a damping member having a flange portion, a body portion, and a shaft; and a bracket. The flange portion of the damping member is attached on the base member while the body portion is inserted in the accommodating portion of the base member, and the bracket is disposed on the shaft of the damping member.

Accordingly, since the vibration absorber absorbs the forward/backward and leftward/rightward vibration as well as upward/downward vibration of the automatic guided vehicle, the breakage of products loaded on the automatic guided vehicle is prevented.

19 Claims, 3 Drawing Sheets

APPARATUS FOR DAMPENING VIBRATIONS OF AN AUTOMATIC GUIDED VEHICLE

This application makes reference to, incorporates the same herein, and claims all benefits accruing under 35 U.S.C. §119 from an application for APPARATUS FOR DAMPING OF AN AUTOMATIC GUIDED VEHICLE earlier filed in the Korean Industrial Property Office on Nov. 4, 1999 and there duly assigned Ser. No. 48564/1999.

BACKGROUND OF THE INVENTION

1. Field of the Invention

The present invention relates to an automatic guided vehicle, and more particularly, to an apparatus for damping vibrations of an automatic guided vehicle and preventing any breakage of products loaded on the automatic guided vehicle.

2. Description of the Related Art

Generally, an automatic guided vehicle runs between workstations to load or unload products, usually loaded with the products thereon.

When the automatic guided vehicle runs, vibration occurs, and products fragile to the vibration are often broken by the vibration of the automatic guided vehicle. To prevent such a breakage of the products by vibration, the automatic guided vehicle employs a vibration absorber on a support which supports a cassette loaded with the products.

More specifically, the vibration absorber is mounted on the supporter on a main frame of the automatic guided vehicle, and the cassette is disposed on the vibration absorber.

The vibration absorber is usually formed of a gas absorber or oil damper, or plate rubber.

While the automatic guided vehicle runs, vibration occurs from the driving portion and is absorbed by the vibration absorber. Since the vibration is not transmitted to the product loaded on the cassette of the automatic guided vehicle, breakage of products can be prevented.

The conventional vibration absorber described above, however, only absorbs the vibration in one direction, i.e., the vibrations in a vertical direction with respect to the vehicle body. Accordingly, horizontally oriented vibrations, i.e., the forward/backward and leftward/rightward vibrations can not be absorbed, often causing the breakage of the product loaded in the cassette.

SUMMARY OF THE INVENTION

The present invention has been made to overcome the above-mentioned problems of the related art, and accordingly, it is an object of the present invention to provide an apparatus capable of damping forward/backward and leftward/rightward vibrations as well as the upward/downward vibrations occurring at the automatic guided vehicle.

The above object is accomplished by an apparatus for damping vibrations of an automatic guided vehicle according to the present invention, including: a base member having an accommodating hole formed therein; a damping member having a flange portion, body portion, and shaft; and a bracket. The flange portion of the damping member is attached to the base member while the body portion is inserted in the accommodating portion of the base member, and the bracket is disposed on the shaft of the damping member.

Since the vibration absorber according to the present invention absorbs the forward/backward and leftward/rightward vibrations as well as upward/downward vibrations of the automatic guided vehicle, the breakage of products loaded on the automatic guided vehicle is prevented.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a schematic view for showing an automatic guided vehicle having a vibration absorber according to the preferred embodiment of the present invention, in which FIG. 2 is a view for showing a vibration absorber according to the preferred embodiment of the present invention in which

DETAILED DESCRIPTION OF THE PREFERRED EMBODIMENT

Hereinafter, the preferred embodiment of the present invention will be described in greater detail with reference to the accompanying drawings.

Figure 1A:
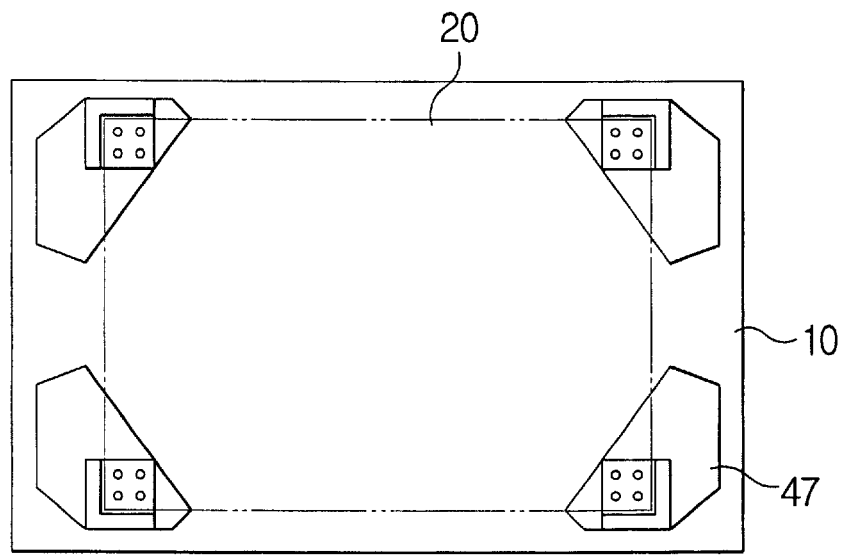
FIG. 1A is a plan view of the automatic guided vehicle.
Figure 1B:
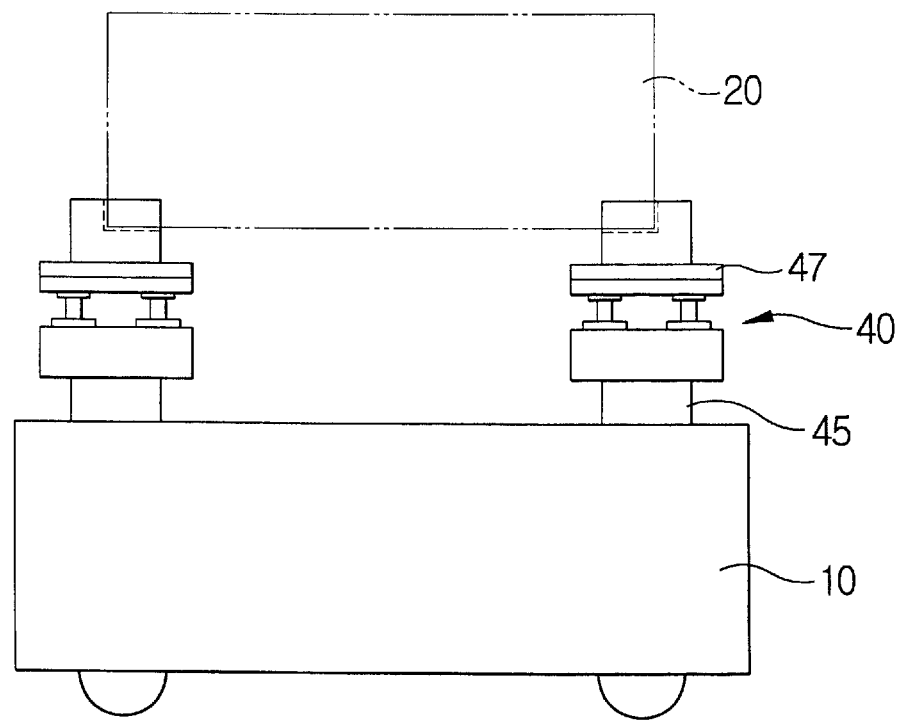
FIG. 1B is a front elevation of the automatic guided vehicle.
Figure 2A:
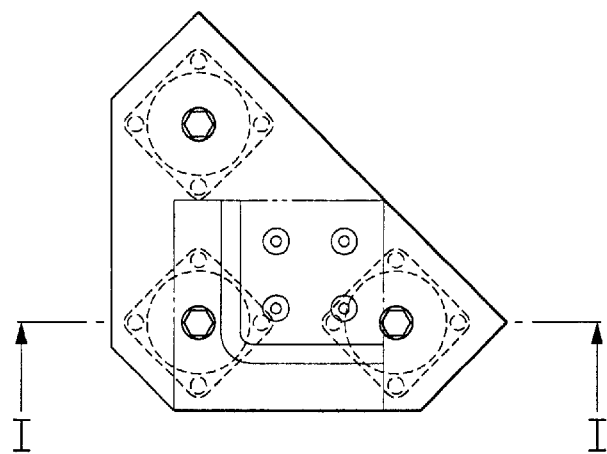
FIG. 2A is a plan view of the vibration absorber.
Figure 2B:
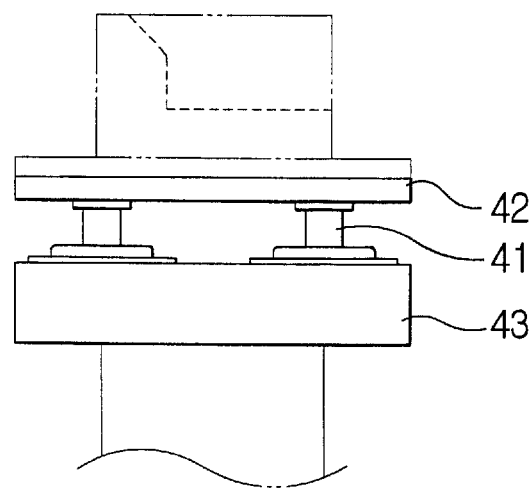
FIG. 2B is a front elevation of the vibration absorber.
Figure 2C:
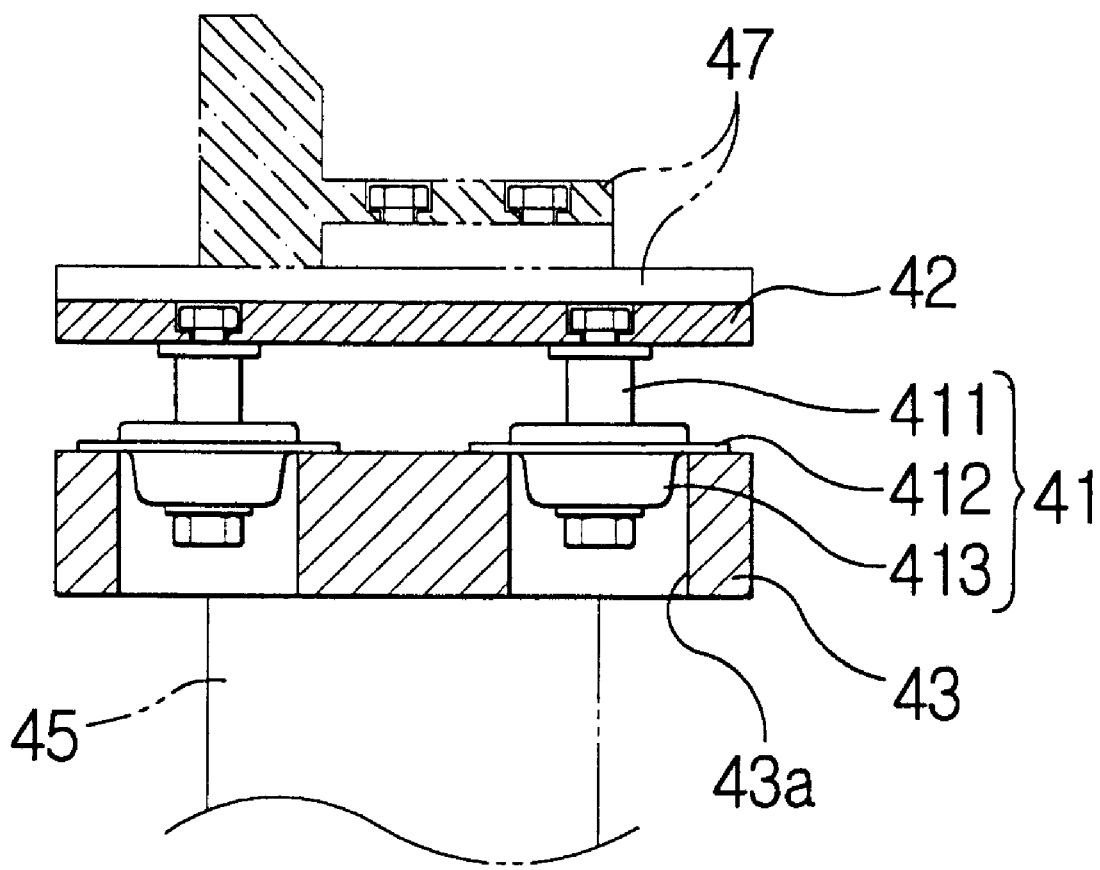
FIG. 2C is a sectional view taken on line I—I of FIG. 2A.

FIG. 1 is a schematic view for showing an automatic guided vehicle having the vibration absorber according to the preferred embodiment of the present invention, in which FIG. 1A is a plan view of the automatic guided vehicle; and FIG. 1B is a front elevation of the automatic guided vehicle. FIG. 2 is a view for showing a vibration absorber according to the preferred embodiment of the present invention in which FIG. 2A is a plan view of the vibration absorber; FIG. 2B is a front elevation of the vibration absorber; and FIG. 2C is a sectional view taken on line I—I of FIG. 2A.

As shown in FIGS. 1 and 2, the vibration absorber 40 according to the preferred embodiment of the present invention is mounted on a supporter 45, which is mounted on the main frame 10 of the automatic guided vehicle in a perpendicular relation with the ground. On the vibration absorber 40, a cassette supporting portion 47 is arranged to support the cassette for loading the products.

The vibration absorber 40 includes a base member 43, damping member 41, and bracket 42. The base member 43 is mounted on the supporter 45, and has an accommodating hole 43a formed therein.

The damping member 41 absorbs vibrations in a three-dimensional direction, and includes a flange portion 412, body portion 413, and shaft 411. The damping member 41 is disposed on the base member 43 by the flange portion 412 while the body portion 413 thereof is inserted in the accommodating hole 43a formed in the base member 43.

The bracket 42 is disposed on the shaft 411 of the damping member 41.

In this embodiment, for the higher damping efficiency of the vibration absorber 40, three damping members 41 are arranged at right angles to each other.

The vibration absorber 40 is disposed on the four supporters 45 on the main frame 10 of the automatic guided vehicle, respectively, so that the cassette 20 loaded with the products are insulated from the vibrations from the main frame 10 by the vibration absorber 40.

The process of insulating the vibrations by the vibration absorber of the automatic guided vehicle according to the present invention will be described in greater detail below.

The source of vibration in the automatic guided vehicle is the driving portion. That is, mainly by the driving and acceleration/deceleration of the automatic guided vehicle, vibration occurs. Among the vibrations toward various directions, there are mainly three directional vibrations, i.e., upward/downward vibrations exerting in upward/downward directions of the automatic guided vehicle body, forward/backward vibrations exerting in forward/backward directions of the automatic guided vehicle body, and leftward/rightward vibrations exerting in leftward/rightward directions of the automatic guided vehicle.

Most of the vibration occurring at the automatic guided vehicle are the upward/downward vibrations which occur due to the driving of the automatic guided vehicle. Like the upward/downward vibrations, the forward/backward vibrations occur by the driving of the automatic guided vehicle, but more often occur by the acceleration/deceleration of the automatic guided vehicle during its starting and stopping. The forward/backward vibrations particularly occur during the accidental stopping of the automatic guided vehicle.

Likewise, the leftward/rightward vibrations occur by the driving of the automatic guided vehicle, but more often occur by the acceleration/deceleration of the automatic guided vehicle during its starting and stopping in a transverse movement.

The vibration from the driving portion of the automatic guided vehicle is transmitted to the supporter 45 mounted on the main frame 10 through the main frame 10 of the automatic guided vehicle. The vibration is then transmitted to the base member 43 of the vibration absorber 40.

The vibration, which would be transmitted to the bracket 42 through the damping member 41 mounted on the base member 43, however, is absorbed due to the upward/downward, forward/backward, and leftward/rightward vibration absorbing characteristic of the damping member 41, and is not transmitted to the bracket 42.

That is, due to the damping member 41, which absorbs the vibrations in a three-dimensional direction of the automatic guided vehicle, vibration is not transmitted to the bracket 42 regardless of the direction thereof. Accordingly, since the vibration is not transmitted to the bracket 42, the cassette 20 supported on the cassette supporting portion 47 on the bracket 42 is also protected from the vibration.

As described above, according to the present invention, since the vibration in almost all directions, i.e., upward/downward, forward/backward, and leftward/rightward vibrations generated from the driving portion of the automatic guided vehicle are absorbed, and consequently, the products loaded in the cassette are protected from the vibration even during the acceleration/deceleration of the automatic guided vehicle when starting or stopping.

As stated above, the preferred embodiment of the present invention is shown and described. Although the preferred embodiment of the present invention has been described, it is understood that the present invention should not be limited to this preferred embodiment but various changes and modifications can be made by one skilled in the art within the spirit and scope of the present invention as hereinafter claimed.

What is claimed is:

1. An apparatus for dampening vibration of an automatic guided vehicle, comprising:
    a vehicle being automatically guided to transport products by accelerating and decelerating from one point to another in a transverse movement;
    a bracket forming a bottom of said vehicle;
    a base member spaced-apart from said bracket and including an accommodating hole formed therein; and
    at least one dampening member absorbing vibrations in a three-dimensional direction of said automatic guided vehicle, said at least one dampening member comprising:
        a body portion;
        a flange portion outwardly extended from an upper portion of said body portion, said flange portion of said dampening member being attached on said base member while said body portion is disposed within said accommodating hole of said base member; and
        a shaft protruding from said body portion toward said bracket, said bracket being disposed on one distal end of said shaft of said dampening member.

2. The apparatus of claim 1, one of said at least one dampening member being arranged on each corner of said bracket of said vehicle.

3. A dampening structure in an apparatus, comprising;
    said apparatus moving transversely;
    a bracket forming a bottom of said apparatus;
    a base spaced-apart from said bracket and including a hole formed on said base;
    a dampening member absorbing vibrations in a three-dimensional direction of said apparatus and preventing the transmission of vibration to said bracket, said dampening member including a main body and disposed within said hole of said base, a flange outwardly extended from an upper portion of said main body and coupled to said base, and a shaft retracting into and protruding from said main body, said shaft including a distal end coupled to said bracket.

4. The dampening structure of claim 3, said flange coupled to a surface of said base facing said bracket.

5. The dampening structure of claim 3, said flange extended from a top portion of said main body toward said bracket.

6. The dampening structure of claim 3, said flange formed around a top portion of said main body.

7. The dampening structure of claim 3, said main body inserted into said hole while said flange is coupled to a top surface of said base formed around said hole.

8. The dampening structure of claim 3, said main body spaced-apart from a wall defining said hole of said base.

9. The dampening structure of claim 3, said main body spaced-apart from said base while said flange is coupled to said base.

10. The dampening structure of claim 3, said main body disposed within said hole of said base while said shaft protruding from said main body is disposed between said base and said bracket.

11. The dampening structure of claim 3, said shaft including a proximal end inserted into said main body, said distal end of said shaft contacting said bracket.

12. The dampening structure of claim 3, said base including a thickness greater than said main body in a direction of an axis passing a longitudinal center of said shaft.

13. The dampening structure of claim 3, said hole defined by a cylindrical wall including a length greater than said main body.

14. An apparatus, comprising:
a vehicle being automatically guided to transport products by accelerating and decelerating from one point to another in a transverse movement, said vehicle comprising:
  a main frame; and
  a supporter mounted on said main frame in a perpendicular relation with the ground;
a vibration absorber dampening vibration of said vehicle, said vibration absorber being mounted on said supporter, said vibration absorber comprising:
  a bracket forming a bottom of said vehicle;
  a base member spaced-apart from said bracket and including an accommodating hole formed therein; and
  at least one dampening member absorbing vibrations in a three-dimensional direction of the automatic guided vehicle and being disposed on said base member, said at least one dampening member comprising:
    a body portion;
    a flange portion outwardly extended from an upper portion of said body portion, said flange portion of said dampening member being attached on said base member while said body portion is disposed within said accommodating hole of said base member; and
    a shaft protruding from said body portion toward said bracket, said bracket being disposed on one distal end of said shaft of said dampening member; and
a cassette supporting portion on said vibration absorber being arranged for a cassette loading products.

15. The apparatus of claim 14, further comprised of at least three dampening members arranged at right angles to each other on said base member.

16. The apparatus of claim 15, further comprised of said supporter being on each corner of said main frame with said vibration absorber being disposed on each supporter insulating said cassette from vibrations from said main frame.

17. A method, comprising:
forming a vehicle being automatically guided to transport products by accelerating and decelerating from one point to another in a transverse movement, said vehicle including:
  disposing a main frame; and
  mounting a supporter on said main frame in a perpendicular relation with the ground;
mounting a vibration absorber on said vehicle to dampen vibration of said vehicle, said vibration absorber being mounted on said supporter, said vibration absorber comprising of:
  forming a bracket on a bottom of said vehicle;
  spacing apart a base member from said bracket and including an accommodating hole formed therein; and
  disposing at least one dampening member on said base member, said at least one dampening member absorbing vibrations in a three-dimensional direction of the automatic guided vehicle, said at least one dampening member comprising of:
    forming a body portion;
    outwardly extending a flange portion from an upper portion of said body portion, said flange portion of said dampening member being attached on said base member while said body portion is disposed within said accommodating hole of said base member; and
    protruding a shaft from said body portion toward said bracket, said bracket being disposed on one distal end of said shaft of said dampening member; and
disposing a cassette supporting portion on said vibration absorber being arranged for a cassette loading products.

18. The method of claim 17, further comprised of arranging at least three damping members at right angles to each other on said base member.

19. The method of claim 18, further comprised of disposing one of said supporter on each corner of said main frame with said vibration absorber being disposed on each supporter insulating said cassette from vibrations from said main frame.

\* \* \* \* \*